(No Model.)
F. H. RICHARDS.
WEIGHING MACHINE BEARING.
No. 600,021. Patented Mar. 1, 1898.
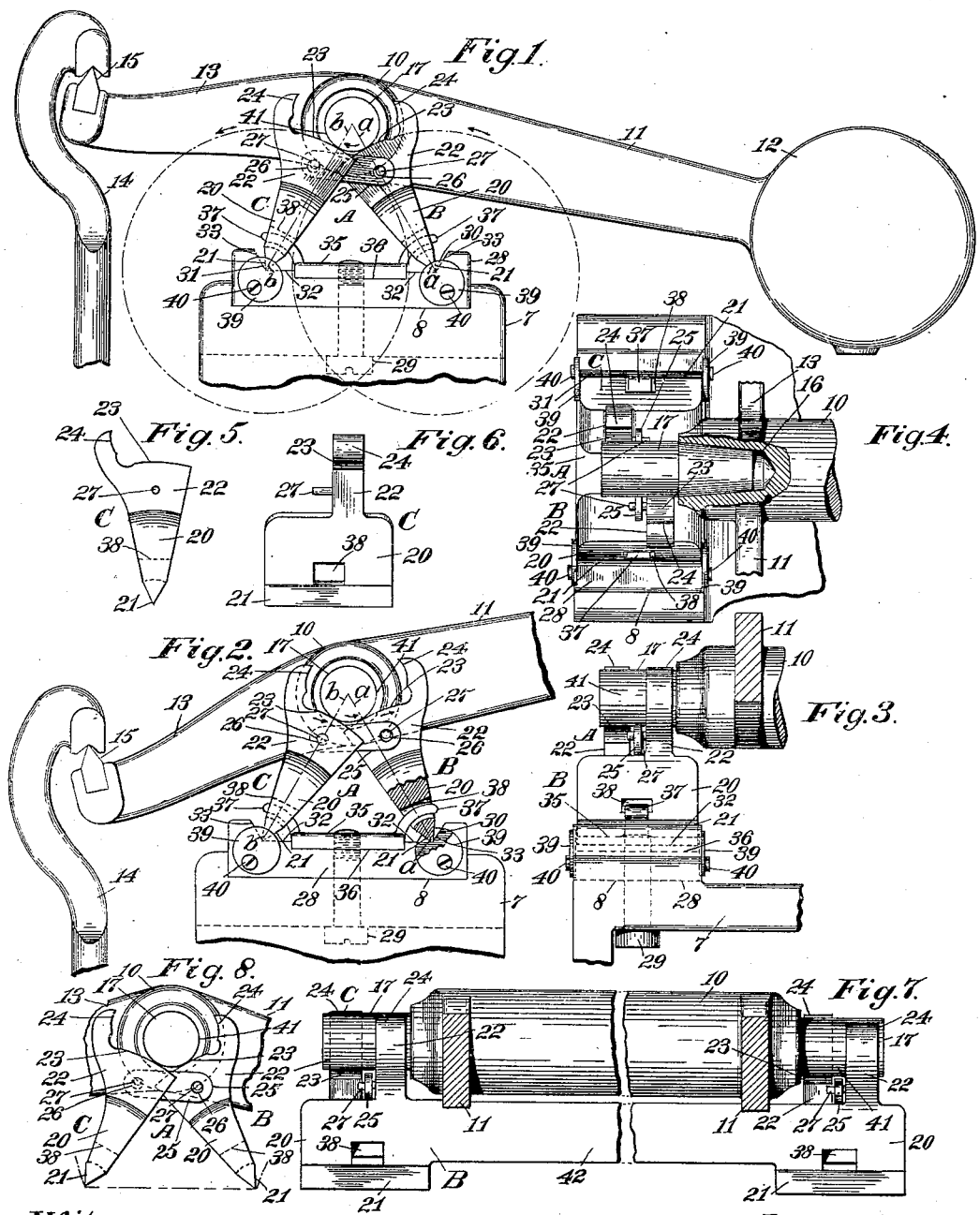
Witnesses
R. W. Pittman
Fred. J. Dole.
Inventor
F. H. Richards

UNITED STATES PATENT OFFICE.

FRANCIS H. RICHARDS, OF HARTFORD, CONNECTICUT.

WEIGHING-MACHINE BEARING.

SPECIFICATION forming part of Letters Patent No. 600,021, dated March 1, 1898.

Application filed October 17, 1896. Serial No. 609,198. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machine Bearings, of which the following is a specification.

This invention relates to bearings, more particularly, however, to that class adapted for use in connection with weighing-machines and for the scale-beams thereof, the object being to provide an improved bearing which while simple in construction and operation can be used to support mechanism of large bulk and weight and which will permit a relatively large angular movement of the oscillatory or movable member or scale-beam in connection with which it is used and in which also the thrust due to the weight of the supported mechanism will be downward and outward and be received by the pivots of such bearing directly in the lines of said thrust and in the use of which bearing the friction of the working parts will be reduced to a minimum.

In the drawings accompanying and forming part of this specification, Figure 1 is a side or end view of one form of this improved bearing and which bearing for the purposes of this specification is shown in connection with a scale-beam of a weighing-machine, herein illustrated in its normal position and carrying the hangers or arms of a bucket or load-receptacle. Fig. 2 is likewise a side or end view of said bearing, partly in section, the scale-beam in this instance, however, being partly broken away and shown in a different position from that illustrated in Fig. 1. Fig. 3 is a view looking toward the left hand in Fig. 2. Fig. 4 is a top view of the bearing with a portion of the scale-beam in section. Fig. 5 is a detail of one of the thrust or supporting members or standards. Fig. 6 is a view thereof looking toward the left hand. Fig. 7 is a view of another form of bearing, also illustrated in connection with a scale-beam of a weighing-machine; and Fig. 8 is an end view thereof looking toward the right hand.

Similar characters designate like parts in all the figures of the drawings.

As a preface to a description of this improved bearing it will be understood that while the same is more particularly adapted for use in weighing-machines in which the scale-beam or operating-beam shaft has a relatively large angular movement, being usually in those particular machines connected by a tension-rod with the lever system that carries the load-receiving bucket or receptacle, and therefore for the purposes of this specification it is shown in connection with such a scale-beam, it might be used not only with other parts of such weighing-machines, but is also applicable to other machines and apparatus, and it will be further understood that the same principle shown herein could be modified and constructed in various ways without departing from the scope of this invention.

This improved bearing comprises in a general way a plurality of movable or rocking bearing members in the nature of thrust or supporting members or standards so formed with relation to their supporting or bearing faces that their pivotal points are below such bearing-faces when said thrust members are in working position.

In the construction shown the scale-beam 10 is provided with the usual weight-arms 11, carrying a weight 12, bucket or receptacle arms 13 for supporting the bucket by means of its hangers or bails 14 in any desired way, as by knife-edge-pivot bearings 15. This scale-beam 10 in this instance is shown supported adjacent to each end thereof by one of these improved bearings, (designated in a general way by A,) and for this purpose each end of said beam has preferably a tapering bore 16 for the reception of a taper-ended journal or trunnion 17, and which journal or trunnion constitutes the means for supporting the scale-beam on the bearings in a manner hereinafter set forth.

In the preferred form thereof herein shown and described this improved bearing A comprises a pair of movable or rocking bearing members in the nature of thrust or supporting members or standards B and C. Each of these members in this instance comprehends a preferably relatively wide base 20, having its under edge forming a knife-edge pivot 21 and a preferably narrow part or arm 22, provided with a curved or convexed bearing or supporting face 23, the curvature thereof extending transversely of the longitudinal plane of its knife-edge, and said bearing-face terminating at one end in an upwardly-extending curved projection, constituting a stop 24 for the journal should the same have a tendency to slip in the operation of the machine. While in the form shown the curved or concaved working face of the stop, in connection with the curved or convex bearing-face of the thrust member, is substantially in the nature of an ogee curve, it will be clearly seen that this is not necessary, and while also in the preferred construction these standards are shown triangular in shape it will be clearly obvious that this is a mere matter of preference. The supporting-arms 22 of these thrust members are, however, so disposed relatively to each other when in working position that one is in front of the other, whereby the planes of such bearing-faces 23 intersect or cross each other and thus form the proper angle at their point of intersection to support a journal or trunnion, this crossing of the bearing-faces being secured in the present structure by forming the arm 22 of each thrust member nearer one side of its base than the other, whereby when said standards are in position the crossing or overlapping of such bearing-faces will form the proper bearing-angle in a manner that will be clearly obvious without a more explicit description, and whereby also, by means of this particular construction of bearing members, they are interchangeable with each other.

In order to maintain the thrust members in positions to form the proper bearing-angle and also permit such members simultaneously to move or rock, they are shown coupled together, one means for accomplishing this purpose preferably comprising a link 25, having an aperture 26 adjacent to each end thereof, into which a stud or pin 27 at the inner opposing side of each arm projects, and which pin is of slightly smaller diameter than said apertures, whereby not only is the spreading of such thrust members prevented, but the lateral movement thereof regulated. As one means for supporting these thrust members when used in connection with a weighing-machine the base 7 thereof is preferably provided with a recess 8, into which a base or bearing block or plate 28 is disposed and preferably secured therein by means of a fastening device, such as a bolt 29. This block or plate is so formed that it is provided with a pair of oppositely-disposed approximately V-shaped bearings 30 and 31, one side of each bearing preferably being formed by the intermediate horizontal wall 32 of said block, while the other side thereof is formed by an inclined wall 33, adjacent to the end of said block. It will be clearly obvious, however, that the knife-edge pivots might be formed on the bearing-block and the V-shaped bearings formed on the bearing members, if desired, without departing from the scope of this invention.

The thrust members B and C are so disposed relatively to this bearing-block 28 that the knife-edge pivot 21 of each thrust member will be in position in the vertex of its respective V-shaped bearing, whereby their convex bearing-faces will cross or intersect each other to form the proper bearing-face for the journal and whereby such knife-edge pivots will be set directly in the lines of the thrust, and thus a firmer and more durable bearing secured.

In order that the knife-edge pivots of the thrust members will be firmly maintained at all times in bearing engagement with their V-shaped bearings, a suitable brace or bar 35 is secured in a recess 36 of the bearing block or plate 28, preferably by means of the same fastening device that secures such block to the base. This brace is provided with a pair of curved ends or projections 37, extending into openings or slots 38 in the bases of the thrust members A and B, the under walls of said openings being curved in parallelism with the curvature of the projections 37 to thereby permit the working or rocking of such thrust members relatively to their bearings.

In order to prevent lateral or sidewise displacement of the knife-edge pivots relatively to their bearings, the bearing-block 28 at each side or end of its V-shaped bearings is preferably countersunk and a disk or other suitable means 39 secured therein by some suitable fastening device, such as a screw 40, and which disks have a part thereof projecting above the vertexes of said bearings, whereby they prevent the knife-edge pivots from shifting laterally.

When this improved bearing is used with a weighing-machine similar, for instance, to that herein illustrated, a bearing A is disposed adjacent to each end of the scale-beam in position to support the journal or trunnion 17 at that end of such beam, said journal or trunnion, which is shown having a curved bearing-face 41, resting in the bearing-angle formed by the crossing convex bearing-face 23 of the thrust members B and C in a manner that will be readily understood, whereby, owing to this particular construction, the true axis of such trunnions will always be in a permanent location and the friction of the same on its bearing-surfaces reduced to a minimum.

In those instances where a plurality of bearings A are used to support the oscillatory member—such, for instance, as a scale-beam, if desired—instead of having the thrust members at each side of the vertical axis of the journal formed as independent members they may be united or constructed as one member, one form of such structure being shown in Fig. 7, in which the bases of a pair of thrust members at each side of the vertical axis of the journal, respectively, are connected by a cross bar or member 42.

In the form of bearing shown in Fig. 7, and in fact whenever a plurality of bearings A are used, it will be seen that the thrust members are preferably disposed in alternation, although this is not necessary, as they may be otherwise disposed, if desired.

It will be clearly seen without the necessity of illustration that the bearing could be so formed whereby one bearing member would have one or more bearing-faces intersecting two or more bearing-faces of the other member in a somewhat similar manner to that illustrated in Fig. 7, in which case, however, the alternating bearing-faces would be in close proximity to each other.

It will be understood that any desired number of bearings might be used, according to the character of the apparatus in connection with which they are to operate.

From the foregoing it will thus be seen that the knife-edge pivots 21 of the standards B and C of the bearing A are set directly in the lines of thrust, which is diagrammatically illustrated by the lines $a\,a$ and $b\,b$, terminating in the axis of the journal, and which axis, as above stated, does not at any time change its position in the operation of the parts, owing to the fact that the convex or curved bearing-face 23 of each standard is concentric with the axis of its respective knife-edge pivot, as indicated by the dotted circles, Fig. 1, and which knife-edge pivots are preferably in the same horizontal but in different vertical planes. Furthermore, it will be seen that the knife-edge pivots 21 of the thrust members have comparatively little movement as compared with the movements of such supporting or bearing faces 23, so that very sharp knife-edges can be used without the liability of breaking off the same in the operation of the device, especially as the thrust comes directly in line with the apex of each pivot, and that the bearing-faces move in the same direction simultaneously with the journal or trunnion, as indicated by the arrows, Figs. 1 and 2.

By forming the standards or thrust members with convex bearing-faces the journal will be supported with less frictional engagement than would be the case if such journal was supported by concaved bearing-faces, as in the latter instance the line of curvature of the journal and the concaved bearing-faces would coincide a comparatively great distance, whereas in the present structure the lines of curvature recede from each other, and hence the journal has a frictional engagement with the convex face of a standard at one point only, thus reducing the friction of the parts to a minimum.

By means of this construction of bearing it will be seen that mechanism of large bulk and weight can be readily supported, while at the same time a relatively large angular movement of the oscillatory or movable member or beam thereof is obtained with a minimum amount of friction.

Having described my invention, I claim—

1. A bearing comprising a pair of oscillatory members, each of said members having a point of support, and a convex bearing-face above said point of support, the convex bearing-face of one member crossing or intersecting the convex bearing-face of the other member, and thereby forming a permanently-maintained bearing-angle; and means for coupling said members for simultaneous movement.

2. A bearing comprising a pair of oscillatory bearing thrust members or standards pivotally supported at their lower ends in opposite non-alined vertical planes for oscillatory movement, and a link pivotally connecting said members together for simultaneous movement, said members formed with bearing-faces crossing or intersecting each other.

3. A bearing comprising a pair of oscillatory bearing members, each having a convex bearing-face, the bearing-face of one member crossing or intersecting the bearing-face of the other member, and thereby forming a permanently-maintained bearing-angle, and each of said bearing members having its convex bearing-face terminating in a stop.

4. A bearing comprising a bearing block or plate having oppositely-disposed, non-alined, V-shaped bearings; and a plurality of bearing members, each having a permanently-maintained, inclined, or oblique position, and also having a convex bearing-face the planes thereof intersecting or crossing each other, thereby forming a V-shaped bearing-angle for supporting a journal or trunnion, said inclined bearing members having knife-edge pivots resting in said oppositely-disposed V-shaped bearings.

5. A bearing comprising a pair of oscillatory bearing members, each bearing member comprising a plurality of thrust members rigid with each other, and each thrust member formed with a bearing-face, the bearing-faces of one oscillatory member intersecting or crossing the bearing-faces of the other oscillatory member.

6. A bearing comprising a bearing plate or block having a plurality of non-alined bearings; a plurality of bearing members pivotally disposed in said bearings, each of said members having a bearing-face the planes of which intersect or cross each other; and fixedly-secured means engaging all of said pivotally-disposed bearing members, for holding the same in bearing engagement with the bearings of said bearing plate or block.

7. A bearing comprising a base plate or block having a pair of oppositely-disposed bearings, a pair of thrust members or standards pivotally disposed in said bearings, each of said standards having a bearing-face, the planes of which intersect or cross each other, and a transversely-extending recess; a link connecting said standards together; and a brace fixedly secured to said base block or plate and having projections extending into the recesses of said standards to thereby hold the same in bearing engagement with the bearings of said base plate or block.

8. A bearing comprising a base plate or block having a pair of oppositely-disposed V-shaped bearings, a pair of thrust members or standards having knife-edge pivots disposed in said bearings, each of said standards having a transversely-extending recess having a curved lower wall and also having a convex bearing-face, the planes of said bearing-faces intersecting or crossing each other and adapted to support a journal or trunnion; a link pivotally connecting said standards together adjacent to their bearing-faces; and a brace fixedly secured to said base plate or block and having curved ends extending into the recesses of said standards to thereby hold the same in bearing engagement with the V-shaped bearings of said base plate or block.

9. A bearing comprising a pair of bearing members, each having a permanently-maintained, inclined, or oblique position, and each of said members comprising a relatively wide base and a relatively narrow arm or part disposed nearer to one side or end than to the other of said base, and said arm or part having a bearing-face, the planes of said bearing-faces crossing or intersecting each other, thereby forming a bearing-angle for supporting a journal or trunnion; and means for pivotally supporting said bases.

10. A bearing comprising a pair of bearing members, each having a permanently-maintained, inclined, or oblique position, and each comprising a triangularly-shaped member having a relatively wide base provided with a knife-edge pivot and a relatively narrow part or arm having a convex bearing-face, the planes of said bearing-faces crossing or intersecting each other; and means for pivotally supporting said knife-edge pivots below said bearing-faces.

11. A bearing comprising a bearing block or plate having oppositely-disposed, non-alined bearings; a plurality of bearing members having bases pivotally disposed in said bearings, the sides or ends of said bases being constantly in alinement with each other, and each of said bearing members having arms or projections above said pivotally-disposed bases and provided with bearing-faces, and said arms or projections being so disposed relatively to said bases that the bearing-faces thereof permanently cross or intersect each other at an angle for supporting a journal or trunnion.

12. A bearing comprising a base plate or block having a pair of oppositely-disposed bearings, a pair of thrust members or standards pivotally disposed in said bearings, each of said standards having a bearing-face, the planes thereof crossing or intersecting each other; and means disposed at each end of the base-block bearings, for preventing endwise or lateral movement of said members.

13. A bearing comprising a base plate or block having a pair of oppositely-disposed V-shaped bearings and a recess at each end of its bearings, a pair of normally obliquely disposed thrust members or standards having knife-edge pivots disposed in said bearings, each of said standards having a transversely-extending recess having a curved lower wall and also having a convex bearing-face terminating in a curved stop device, the planes of such bearing-faces crossing or intersecting each other whereby such bearing-faces are adapted to support a journal or trunnion; a link pivotally connecting said standards together; a brace fixedly secured to said base-block and having curved projections extending into the recesses of said standards to thereby hold the same in engagement with their V-shaped bearings; and means disposed in each recess of said base or block and having a part thereof projecting above each apex, respectively, of the V-shaped bearings for preventing the shifting of the knife-edge pivots therein.

14. A bearing comprising a pair of bearing members, each having a pair of relatively remotely disposed convex bearing-faces, the bearing-faces of each member alternating with, and crossing or intersecting the bearing-faces of, the opposite member thereof and forming permanently-maintained bearing-angles adapted to support one or more journals or trunnions, and each of said bearing members having a knife-edge pivot; and means having oppositely-disposed, non-alined V-shaped bearings for supporting said knife-edge pivots.

15. A bearing comprising a plurality of bearing members, each having a plurality of relatively remotely disposed convex bearing-faces, the bearing-faces of each member alternating with, and crossing or intersecting the bearing-faces of, the opposite member thereof, and forming permanently-maintained bearing-angles adapted to support a journal or trunnion, and each of said bearing members having a plurality of knife-edge pivots; means for coupling said bearing members; and means having oppositely-disposed, non-alined V-shaped bearings for supporting said knife-edge pivots in different vertical planes below said bearing-faces.

16. As an element in a bearing, a bearing member comprehending a knife-edge pivot and a plurality of independent members or arms rigid with said knife-edge pivot and with each other, and each of said arms formed with a bearing-face.

17. As an element in a bearing, a bearing member comprising a plurality of independent members or arms rigid with each other, and each of said arms having a knife-edge pivot and formed with a convex bearing-face.

18. The combination, with oscillatory means to be supported, of a bearing comprising a plurality of permanently maintained, inclined, or oblique oscillatory bearing members supported at their lower ends in different vertical planes for oscillatory movement by and with said oscillatory supported means, and formed with intersecting or crossing bearing-faces movable in the same direction simultaneously with said oscillatory means, the thrust of said oscillatory supported means being downwardly and obliquely and in a direct line with the pivotal points of said bearing members throughout the entire movement of said members therewith.

FRANCIS H. RICHARDS.

Witnesses:
FRED. J. DOLE,
HEATH SUTHERLAND.